United States Patent [19]
Berkers

[11] Patent Number: 4,788,900
[45] Date of Patent: Dec. 6, 1988

[54] ADJUSTABLE BLADE SUPPORT FOR ROUND BALE PRESS STRIPPER

[75] Inventor: Ansvar Berkers, Heeze, Netherlands

[73] Assignee: P. J. Zweegers En Zonen Landbouwmachinefabriek BV, Netherlands

[21] Appl. No.: 31,238

[22] Filed: Mar. 26, 1987

[30] Foreign Application Priority Data

Apr. 2, 1986 [DE] Fed. Rep. of Germany ....... 3610970

[51] Int. Cl.$^4$ .......................... B30B 9/30; A01F 15/00
[52] U.S. Cl. .......................................... 100/88; 56/341
[58] Field of Search ............................ 100/88; 56/341; 101/157, 169; 15/256.51

[56] References Cited

U.S. PATENT DOCUMENTS

| | | |
|---|---|---|
| 3,125,948 | 3/1964 | Redding .................... 100/88 |
| 4,240,339 | 12/1980 | Simonis ..................... 100/88 X |
| 4,434,522 | 3/1984 | Linzberger ................. 101/157 X |
| 4,581,879 | 4/1986 | Anstey ....................... 56/341 |
| 4,648,239 | 3/1987 | Geiser et al. ............... 56/341 |

Primary Examiner—Andrew M. Falik
Attorney, Agent, or Firm—Laff, Whitesel, Conte & Saret

[57] ABSTRACT

A round bale press for agricultural stalk material which has a housing defining a pressing chamber with variable volume. The pressing chamber is defined by opposed side walls of the housing and at least one continuous belt within the chamber. The belt is guided by a plurality of cylindrical rollers. At least one stripping device is attached to the housing adjacent one of the rollers which is adjacent to the feeding area. The stripping device consists of a rail with supporting plates on both end sections. On said rail a steel knife blade is mounted for contacting the surface of the roller with uniform contact pressure over the longitudinal extension of the roller surface. At least one clamping device is integrated into the stripping device which is actuatable from outside the housing side walls for bending a central section of the rail relative to the end sections of said rail. A uniform contact pressure between the knife blade and the surface of the roller is achieved. Furthermore, said contact pressure of the knife is readjustable also during operation and in the assembled condition of the round bale press.

14 Claims, 2 Drawing Sheets

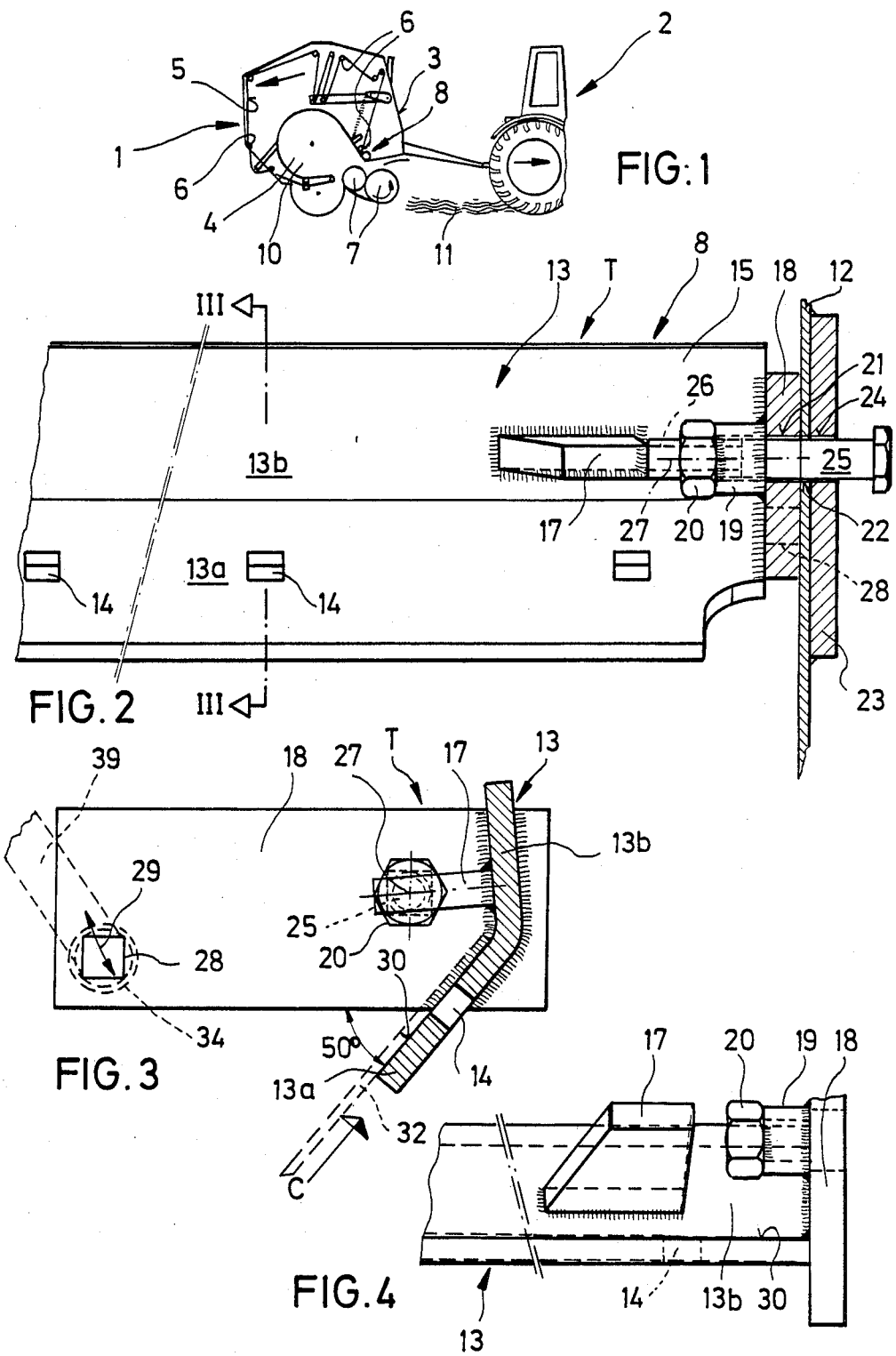

ADJUSTABLE BLADE SUPPORT FOR ROUND BALE PRESS STRIPPER

BACKGROUND OF THE INVENTION

This invention relates to a baler that produces round bales of agricultural stalk material and having at least one stripping device. In U.S. Pat. No. 4,648,239, a scraper is arranged for one roller. Said scraper comprises a knife blade contacting the surface of the roller. The knife blade is mounted by screws to the edge of a carrier rail which is supported between the housing side walls by means of support plates. The knife blade cannot be adjusted after assembly. My invention provides a baler having a It is also known from U.S. Pat. No. 4,581,879 to have two short knife blades stationary mounted to the housing side walls in cooperation with spiral members on the surface of the roller.

U.S. Pat. No. 4,240,339 discloses a stripper formed by an L-shaped rail mounted on an edge portion of a separation wall outside the pressing chamber. Said L-shaped rail contacts the surface of the roller. After assembly, no further adjustment of the rail is possible.

In U.S. Pat. No. 3,125,948 a dancing cross-bar is provided and guided by suitable arms. Said dancing bar contacts the roller in order to hinder stalk material from wrapping around the roller.

My invention provides a baler having a pressing chamber with variable volume which is confined in a housing by at least one continuous belt. The housing has two opposed housing side walls. the belt is guided by a plurality of cylindrical rollers and there is at least one stripping device associated to one of the rollers. The stripping device consisting of a support containing a rail having a central section and first and second end sections carrying supporting plates, and having a long spring steel knife blade fastened to the support. The supporting plates are pivotally mounted between the housing side walls about an axis lying parallel to the longitudinal axis of the support. The support plates are adjustably connected to an adjusting means for adjustment of their angular position in order to have a contact between the knife plate and the surface of the roller. Thus, the contact pressure of the plate on the roller surface can be made uniform over the longitudinal extension of the knife plate by convex bending of the rail with its knife blade towards the surface of the roller. At least the roller adjacent to the feeding area of stalk material to the pressing chamber needs a stripping device to hinder stalk material from wrapping or winding around the roller. The roller wrapped by stalk material would jeopardize the entire operation of the round bale press.

The rail of the stripping device is bent by approximately 2 to 3 mm convexly towards the surface of the roller. Said roller is provided adjacent to the feeding area of stalk material to the pressing chamber. In this region of the pressing chamber there is permanent danger that stalk material will inadvertently pass the gaps between the belts and will be collected around the surface of the roller. Said bending is transmitted to the knife blade on the rail. By means of pivotal adjusting means of the supporting plates the knife blade is brought into contact with the surface of the roller until the knife blade contacts over its longitudinal extension the roller surface with a uniform contact pressure. However, after this adjustment of the supporting plates, said plates must be firmly pulled against the inner sides of the housing side walls. Because of unavoidable production and assembly tolerances the rail with its knife blade is then straightened by pulling the support plates firmly against the housing side walls so much that its preshaped ending is eliminated and the contact pressure of the knife blade in the central section of the roller is reduced or lost. Stalk material which has passed through the gaps between the belts then presses the knife blade in the central section of the roller away from the surface of the roller and wraps around the roller.

The present invention effectively hinders wrapping or buildup of stalk material on the roller.

According to the present invention there is provided an improved stripping device for preventing harvested stalk material from wrapping around a roller in a round bale press. More specifically there is provided a possibility to adjust the contact pressure between the knife blade and the surface of the roller in order to achieve a uniform contact pressure over the longitudinal extension of the roller surface.

The object of the invention is to provide a stripping device which will effectively prevent stalk material from wrapping around the harvester roller.

A more specific object is to provide a stripping device which easily allows it to adjust and readjust the contact pressure of the knife blade from outside and also after assembly of the round bale press.

A further object is to provide a stripping device which may be easily retrofit onto existing round bale presses.

These and other objects will become apparent from a reading of the ensuing description together with the appended drawings.

BRIEF DESCRIPTION OF THE DRAWINGS

The embodiments of the subject matter of the invention are explained in the following by means of the drawing.

FIG. 1 shows a schematic lateral view of a round bale press during operation, a stripping device being only outlined at one roller FIG. 2 shows an enlarged detailed sectional view of the stripping device of FIG. 1.

FIG. 3 is a side view of the rail and the support plate taken along the section line III—III in FIG. 2.

FIG. 4 shows a view of the detail of FIG. 3 in the line of sight of an arrow C.

DESCRIPTION OF THE PREFERRED EMBODIMENT

Figure 5:
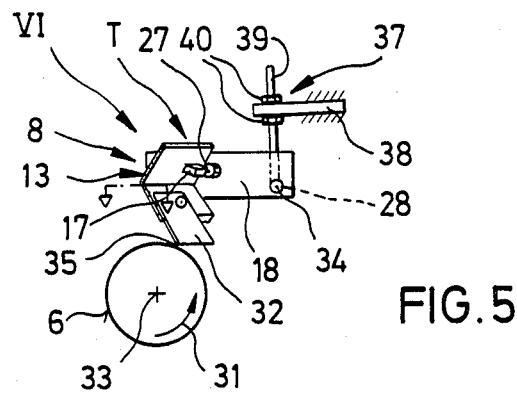
FIG. 5 shows a sectional view of the stripping device in its cooperation with a roller in a plane V—V of FIG. 6.

A round bale press 1 for processing agricultural stalk material according to FIG. 1 is pulled by a tractor and has a housing 3 supported on wheels in which a pressing chamber 4 of variable size is contained. The pressing chamber 4 is limited by a plurality of adjacent belts 5 which are guided over rollers 6, some of which may be driven. The belts 5 are guided in a given continuous line in such fashion that they limit by corresponding movements of the rollers 6 the form of the pressing chamber 4 having an approximately circular cross-section The stalk material 11 is fed by receiving rollers 7 into the pressing chamber 4 and is compressed to a gradually growing round bale 10. In some types of stalk material there is the latent risk that the stalk material passes between the belts 5 and is wound around the rollers 6 which may lead to failures of or damage to the round bale press. The roller 6 located above the feeding area is especially critical. This roller 6 has a stripping device 8 is associated with it. The device 8 strips off stalk material having possibly passed the belts from the roller 6. The stripping device is fastened between the housing walls and is easily disassembled or its pressing pressure against the roller 6 adjusted.

Details of the stripping device 8 of FIG. 1 can be recognized in FIGS. 2, 3 and 4. A support T extending in parallel to the roller 6 is mounted between the housing walls 12 of the housing 3, which consists of a rail 13 of angular cross-section with square supporting plates 18 welded on both ends. A long spring steel knife 32 is fastened to the upper side 30 of the leg 13a of the rail 13, outlined in FIG. 3, which is pressed against the surface of the roller 6 obliquely and opposite to the direction of rotation of the roller 6. The knife 32 is fixed in fastening openings 14 of the rail leg 13a.

Each supporting plate 18 rests against the inner side of the housing wall 12. A first abutment 17 in the form of a bracket is welded in each end section 15 of the rail 13 at the rail leg 13b, the bracket 17 is aligned in longitudinal direction of the rail 13 to a second abutment in the form of a nut 20 welded with a distance sleeve 19 to the supporting plate 18. A bore 21 is provided in the supporting plate 18 in alignment with the threaded bore of the nut 20, which is in alignment with bore 22 in the housing wall 12 and bore 24 in a reinforcement plate 23 which is welded onto the outside of the housing wall 12. A clamping element 25 in the form of a pressure screw traverses the bores and can be screwed in the nut 20 with a front threaded section 26 in such fashion that it presses with its free end against the first abutment 17. The barrel section extending between the threaded section 26 and the head of the pressure screw is without thread. The longitudinal axis of the pressure screw 25 forms the axle of rotation 27 of the supporting plate 18, with which the same is pivotably mounted in the housing wall 12. A square opening 28 is provided in the supporting plate 18 at a distance from the nut 20, in which a pivotal adjusting means 37 FIG. 5 engages and with which pivotal adjusting movements can be transmitted to the supporting plate 18 in the direction of a double arrow 29.

According to FIG. 5 the pivotal adjusting means 37 consists of a stop 38 firmly connected to the housing 3 or the housing wall 12, which is traversed by a clamping screw 39, which can be longitudinally adjusted relate to the stop 38 with counter-nuts 40. The other end of the clamping screw 39 engages in a pressure screw 34, which projects through an oblong hole or a slot in the housing wall 12 and engages in the bore 28 of the supporting plate 18. As indicated in FIG. 3 the plate 18 is shiftably supported by the bolt 25 in the sidewall or in the reinforcement structures of the sidewalls and can be moved in the directions indicated by the double arrow 29 in FIG. 3 by the loosening or tightening of the nuts 40. It can furthermore be recognized in FIGS. 5 and 6 that the knife 32 fastened to the rail leg 13a of the support T projects beyond the lower edge of the rail leg 13a and is directed obliquely against the surface of the roller 6, which rotates about an axis 33 in the direction of rotation 31.

Figure 6:
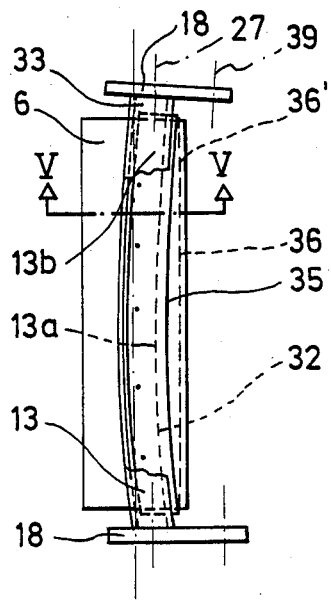
FIG. 6 shows a view of the stripping device of FIG. 5 in the line of sight of an arrow VI and FIGS. 7a, b, c show three embodiment variants of the stripping device as a schematic representation

Referring to FIGS. 2,5, and 6, the assembly and adjustment of the stripping device 8 is outlined.

The support T is at first inserted into the housing 3 and supported in the housing walls 12 by means of the pressure screws 25. The knife 32 is fastened to the support T. Then the pressure screws 34 are inserted into the bores 28 and the pivotal adjusting means 37 are actuated until the edge 36 of the knife 32 rests across the length of the surface of the roller 6, the rail 13 being still straight. Then the clamping devices at both end sections 15 are actuated, i.e. the pressure screws 25 are tightened until they press at first against the abutments 17 and the rail 13 is convexly bent in its central area and finally only the central area of the knife 32 rests at 35 on the surface of the roller. Then the ends of the knife project at a distance of 2 to 3 mm from the surface of the roller 6. Then the supporting plates 18 are pivoted about the axis of rotation 27 by actuating the pivotal adjusting means 37 (in clockwise direction in FIG. 5) until the knife 32 rests with the edge 36 against the surface of the roller 6 across the entire length of the knife (outlined in dashes at 36'). Then it is examined by means of a feeler gauge or a knife blade whether the same can be forced through between the surface of the roller 6 and the knife 32 with the same resistance across the entire length of the knife. If the pressing pressure is noticeably higher in the central area of the roller 6 than in the end areas, the pressure screws 25 are correspondingly loosened. If the pressing pressure is on the other hand smaller in the central area than in the end areas the pressure screws 25 are tightened still more until there is the same pressing pressure across the entire length of the knife.

If the pressing pressure is altogether too high, it is reduced by means of the pivotal adjusting means 37.

The pressing pressure of the knife 32 is possibly checked during intervals in operation and readjusted in the manner indicated above. By tightening the pressure screws 25 and subsequent tightening of the pressure screws 34 the supporting plates are pressed closely against the inner side of the housing walls 12 so that the support T is seated non-displaceably in the housing 3.

Figure 7A:
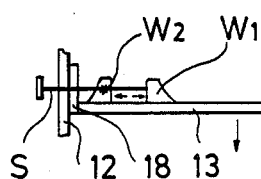
Figure 7B:
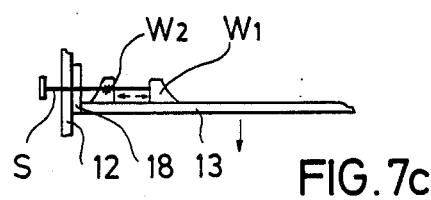
Figure 7C:
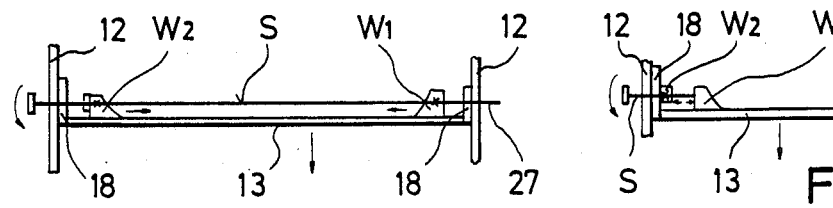

FIGS. 7a, 7b and 7c outline three different embodiments of the stripping device. In the embodiment according to FIG. 7a the first and second abutments W1, W2 of the single, provided clamping device are directly fastened to the rail 13. The clamping element is a long tension bolt which forms at the same time the axle of rotation 27 and has a head at at least one end located outside the housing wall 12. The clamping element S engages with a thread in the first abutment W1 and is either supported on the second abutment W2 with an axially effective collar in the direction of tension or engages also there with an opposed thread section in a counter-thread of the second abutment W2. The clamping element S has no thread engagement in the supporting plates 18 and in the housing walls 12. If the clamping element is rotated as outlined by an arrow, it pulls the abutments W1 and W2 against each other, whereby the rail 13 is bent or biased in the manner mentioned above.

In the embodiment of FIG. 7b, which corresponds to FIGS. 2 to 6, the first abutment W1 is fastened to the rail 13 and the second abutment W2 to the supporting plate 18. The clamping element is designed as a pressure screw which rests in the second abutment W2 in a thread engagement and presses with the free end against the first abutment W1. Then the two abutments W1 and W2 are pressed away from each other so that the supporting plate 18 is on the one hand pressed against the inner side of the housing wall and the rail 13 is on the other hand bent or biased.

In the embodiment according to FIG. 7c a clamping device is provided at each end section of the rail 13, in which the first and second abutments W1 and W2 are directly attached to the rail 13, whereas the clamping element freely traverses the supporting plate 18 and the housing wall 12. The clamping element is in a threaded engagement with the second abutment W2 and presses with its free end against the first abutment W1 so that it presses the two abutments W1, W2 away from each other when the pressure screw is turned to increase pressure and bends the rail 13 or biases it in bending direction.

Instead of the clamping elements S designed as clamping, tension or pressure screws also a pneumatic or hydraulic working cylinder could be used in all represented embodiments, which is acted upon with a pressure means from the outside. Also a spring-loaded cylinder would be conceivable. The loaded spring force would be released to make the desired knife pressure against the surface of the roller in the degree necessary in each case, e.g. by venting.

To check the pressing pressure of the knife in the adjustment the user of the round bale press could have a sensing element at his disposition which contains a strain gauge that can indicate the pressing pressure sensed in each case so that the pressing pressure of the knife can be coordinated with the stalk material processed in each case. It is important that the pressing pressure is selected to prevent winding. A pressure which is to high would lead to great wear and to an undesired heating.

I claim:

1. A round bale press for agricultural stalk material comprising a pressing chamber with variable volume which is defined by a housing and by at least one continuous belt, said housing comprising two opposed housing side walls, said belt is guided by a plurality of cylindrical rollers, at least one stripping device connected to said housing adjacent to one of said rollers, said stripping device consisting of a support containing a rail having a central section and first and second end sections carrying supporting plates, a long spring steel knife blade fastened to the rail, said supporting plates being pivotally mounted between said housing side walls about an axis lying parallel to the longitudinal axis of the support, said support plates being adjustably connected to an adjusting means for adjustment of their angular position in order to have a contact between the knife blade and the surface of the roller, wherein the contact pressure of the blade edge on the roller surface can be made uniform over the longitudinal extension of the knife blade by the convex bending of the rail with its knife blade towards the surface of the roller, characterized in that for the bending of the rail there is provided at least one clamping device which can be actuated from outside the housing side walls and that by means of said clamping device the central section of the rail can be bent relatively to the end sections of the rail towards the surface of the roller.

2. A round bale press according to claim 1, characterized in that a clamping device is provided on each end section of the rail.

3. A round bale press according to claim 1 wherein the clamping device is disposed at each end section between the rail and each supporting plate and that the angle between the end section of the rail and the supporting plate can be changed with the clamping device.

4. A round bale press according to claim 1 wherein the clamping device contains a first and second abutment spaced in a longitudinal direction of the rail, at least the first abutment being fastened to the rail and an adjustable clamping element is inserted between the abutments, which acts on the first and second abutments to provide a banding of the rail section located between the first and second abutments in the case of an adjustment.

5. A round bale press according to claim 2 wherein the second abutment is fastened to one of the supporting plates and the clamping element is a pressure element.

6. A round bale press according to claim 4 wherein the second abutment of said clamping device is fastened to the rail and said clamping element is a pressure element.

7. A round bale press according to claim 4, wherein the second abutment is fastened to the rail, both abutments are disposed in the end sections and that a tensile force can be produced between the two abutments with the clamping element.

8. A round bale press according to claim 7, wherein the rail has a two-leg angular cross-section and that the clamping means is fastened to one leg and the knife to the other leg.

9. A round bale press according to claim 5 wherein the first abutment is a bracket firmly welded to the rail and the second abutment is a nut firmly welded to the supporting plate and the clamping element is a pressure screw screwed into the nut from outside the housing wall and has a free end against the bracket.

10. A round bale press according to claim 9, wherein the nut is attached to a distance sleeve mounted on the supporting plate.

11. A round bale press according to claim 9, wherein a slot being concentrical to the axis of rotation is provided in the housing wall for the pressure screw.

12. A round bale press according to claim 1, wherein a pressure screw which traverses the housing wall is in a through-bore and is the axle of rotation of the supporting plate.

13. A round bale press according to claim 12, wherein the housing wall is reinforced by a plate in the area of the through-bore.

14. A round bale press according to claim 1, wherein the supporting plates can be pressed to the inner side of the housing walls by means of a clamping screw in a pivotal adjusting device and by means of the clamping device.

* * * * *